(12) United States Patent
Neal (10) Patent No.: US 11,673,504 B2
(45) Date of Patent: Jun. 13, 2023

(54) SLIDE-OUT SUPPORT ROLLER FOR RECREATIONAL VEHICLES

(71) Applicant: Thor Tech, Inc., Elkhart, IN (US)

(72) Inventor: Howard Bradley Neal, Muscle Shoals, AL (US)

(73) Assignee: THOR TECH, INC., Elkhart, IN (US)

( * ) Notice: Subject to any disclaimer, the term of this patent is extended or adjusted under 35 U.S.C. 154(b) by 38 days.

(21) Appl. No.: 17/504,821

(22) Filed: Oct. 19, 2021

(65) Prior Publication Data

US 2023/0122020 A1 Apr. 20, 2023

(51) Int. Cl.
*B60P 3/34* (2006.01)

(52) U.S. Cl.
CPC ..................... *B60P 3/34* (2013.01)

(58) Field of Classification Search
CPC .............................. B60P 3/34; F16C 29/0626
USPC ...... 296/26.09, 26.13, 165, 172, 175; 52/67; 384/50, 58
See application file for complete search history.

(56) References Cited

U.S. PATENT DOCUMENTS

| | | | |
|---|---|---|---|
| 6,007,142 A * | 12/1999 | Gehman | B60P 3/34 296/173 |
| 6,527,324 B2 | 3/2003 | McManus et al. | |
| 6,608,227 B1 | 8/2003 | Wacker | |
| 6,729,669 B2 | 5/2004 | McManus et al. | |
| 6,868,638 B1 | 3/2005 | Gardner | |
| 9,366,325 B2 | 6/2016 | Yoder et al. | |
| 11,465,546 B2 * | 10/2022 | Statesman | B60P 3/34 |

FOREIGN PATENT DOCUMENTS

EP 2853878 A1 4/2015

OTHER PUBLICATIONS

RV Recessed Slide Out Roller Zinc New Camper, url: https://www.rvlocksandmore.com/SOR-RM-108-Z, retrieved Jul. 6, 2021, 2 pp.

* cited by examiner

*Primary Examiner* — Joseph D. Pape
(74) *Attorney, Agent, or Firm* — Dinsmore & Shohl LLP (57) ABSTRACT

A recreational vehicle has a vehicle body having a slide-out receiving opening, a slide-out disposed in the slide-out receiving opening, the slide-out being movable between a retracted position and an extended position, and a support roller disposed between the vehicle body and the slide-out, the support roller having a base portion and a roller portion. The base portion of the support roller has a base, first and second flanges extending from the base, a slot being defined in each of the first and second flanges, and a pivot bolt supported by the slot. The pivot bolt interconnects the roller portion with the slots in the first and second flanges. The pivot bolt in a non-fixed state is slidable along the slots such that a distance between the base and the roller housing is adjusted.

19 Claims, 6 Drawing Sheets

SLIDE-OUT SUPPORT ROLLER FOR RECREATIONAL VEHICLES

FIELD OF THE INVENTION

The present disclosure relates to recreational vehicles, and more particularly, to recreational vehicles with a slide-out support roller configured to support a slide-out.

BACKGROUND OF THE INVENTION

A slide-out of a recreational vehicle provides additional space inside the recreational vehicle. The slide-out usually extends outward to increase the interior space of the recreational vehicle and retracts back to be set up for driving. The slide-out may be moved between an extended position and a retracted position. While being extended and retracted, the slide-out may need a support that provides vertical and/or horizontal adjustment to allow use of the slide-out of the recreational vehicle.

SUMMARY OF THE INVENTION

According to the subject matter of the present disclosure, recreational vehicles (RVs) have a vehicle body with a slide-out receiving opening, a slide-out at least partially disposed in the opening, and a support roller disposed between the slide-out and the body to movably support the slide-out. The support roller provides for adjustment in the position of a roller portion relative to a base.

In accordance with one embodiment of the present disclosure, a recreational vehicle has a living space defined therein, the recreational vehicle may comprise a vehicle body enclosing the living space, the vehicle body having a slide-out receiving opening, a slide-out disposed at least partially in the slide-out receiving opening, the slide-out being movable between a retracted position and an extended position, and a support roller disposed between the vehicle body and the slide-out and movably supporting the slide-out. The support roller may have a base portion and a roller portion, wherein the base portion of the support roller has a base, first and second flanges extending from the base, a slot being defined in each of the first and second flanges, and a pivot bolt supported by the slot. The roller portion may include a roller housing, a roller shaft supported in the roller portion, and a roller rotatably supported on the roller shaft. The pivot bolt may interconnect the roller housing with the slots in the first and second flanges, the pivot bolt in a non-fixed state being slidable along the slots such that a distance between the base and the roller housing is adjusted by adjusting the pivot bolt in the slots, the pivot bolt in a fixed state being fixed relative to the slots, and the roller housing being pivotable around the pivot bolt as an axis.

In accordance with another embodiment of the present disclosure, a recreational vehicle may comprise a vehicle body generally enclosing a living space, the vehicle body having an exterior body surface and a slide-out receiving opening defined in the exterior body surface, and a slide-out disposed at least partially in the slide-out receiving opening. The slide-out may have an exterior slide-out surface and a lower surface, the slide-out being movable between a retracted position wherein the exterior slide-out surface is generally flush with the exterior body surface and an extended position wherein the exterior slide-out surface is spaced outwardly from the exterior body surface. At least one support roller may be disposed between the vehicle body and the slide-out, the support roller having a base portion fixed to the vehicle body or the slide-out and a roller portion engaging the other of the vehicle body or the slide-out. The base portion of the at least one support roller may have a base and first and second flanges extending upwardly from the base, and a slot defined in each of the first and second flanges. The roller portion may include a roller housing, a roller shaft supported in the roller portion, and at least one roller rotatably supported on the roller shaft. A pivot bolt may interconnect the roller housing with the slots in the first and second flanges such that a distance between the base and the roller housing is adjusted by adjusting the pivot bolt in the slots, and the roller housing may be pivotable end-to-end when the pivot bolt is fixed.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION OF THE INVENTION

The present disclosure is directed to recreational vehicles with a slide-out that is supported by a support roller. As used in the present disclosure, a "recreational vehicle" may refer to any motor vehicle or trailer which includes living quarters designed for accommodation. Types of recreational vehicles may include, but are not limited to, motorhomes, campervans, caravans (also known as travel trailers and camper trailers), fifth-wheel trailers, gooseneck trailers, popup campers, and truck campers. Recreational vehicles may also include toy haulers or car haulers with living quarters.

Figure 1:
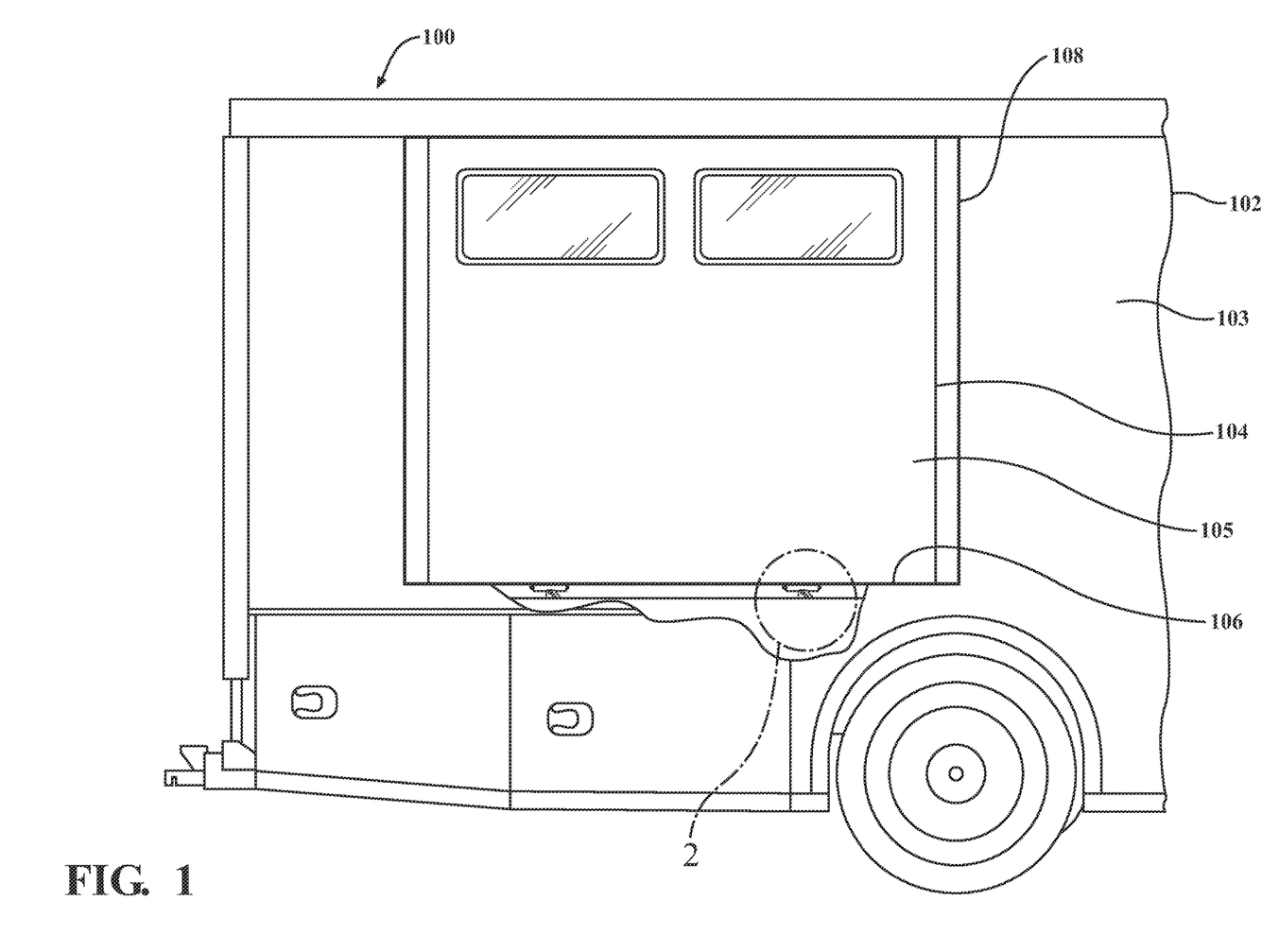
FIG. 1 is a schematic illustration of a portion of a recreational vehicle according to one embodiment of the present disclosure.

Referring initially to FIG. 1, a recreational vehicle 100 may include a vehicle body 102 generally enclosing living quarters (i.e., living space). The vehicle body 102 may include an exterior body surface 103 and a slide-out receiving opening 108 defined in the exterior body surface 103. The recreational vehicle 100 may further include a slide-out 104 being disposed in the slide-out receiving opening 108. For example, the slide-out 104 may be disposed at least partially in the slide-out receiving opening 108 or disposed entirely in the slide-out receiving opening 108.

The slide-out 104 may have an exterior slide-out surface 105 and a lower surface 106. The slide-out 104 may be movable between a retracted position and an extended position. When the slide-out 104 is in the retracted position, the exterior slide-out surface 105 is generally flush with the exterior body surface 103. When the slide-out 104 is in the extended position, the exterior slide-out surface 105 is spaced outwardly from the exterior body surface 103. The slide-out 104 may provide additional space (i.e., living space) in the vehicle body 102 when in the extended position. The lower surface 106 of the slide-out 104 may be supported by at least one support roller 200, which is further supported by the vehicle body 102 as illustrated in an enlarged view provided in FIG. 2. The slide-out 104 may be supported by two support rollers 200 as illustrated in FIG. 1. The number of the support roller 200 may be increased to more than two to provide adequate support.

Figures 2, 3:
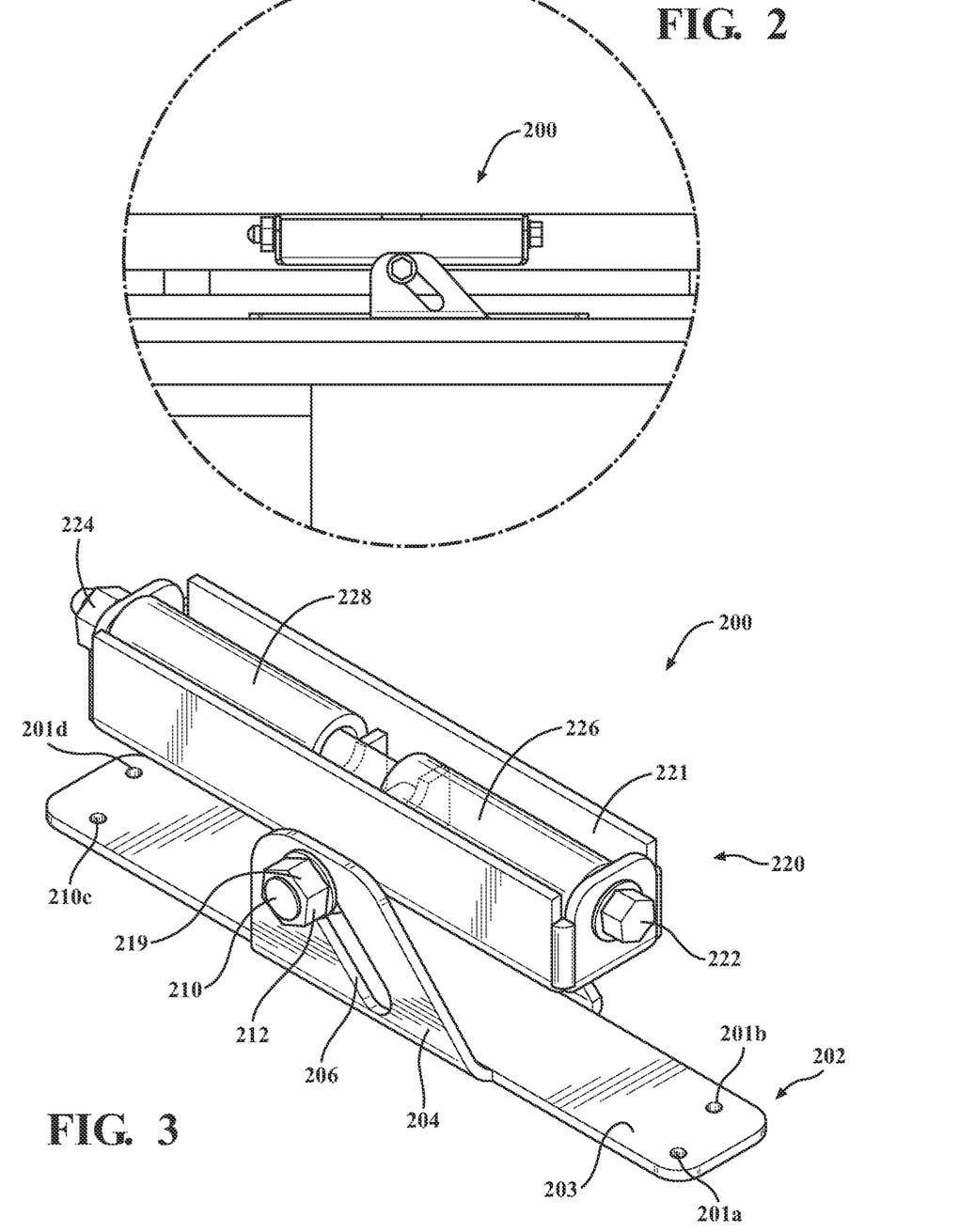
FIG. 2 is an enlarged view of circled region 2 in FIG. 1 illustrating a configuration of a support roller of the recreational vehicle according to one embodiment of the present disclosure.
FIG. 3 is a schematic illustration of the support roller according to one embodiment of the present disclosure.

Referring to FIG. 3, the support roller 200 may include a base portion 202 and a roller portion 220. The base portion 202 may include a base 203, a first flange 204, and a second flange 205. The first and second flanges 204 and 205 may extend from the base 203 perpendicular to a lateral direction of the base 203. For example, the first and second flanges 204 and 205 extend upwardly from the base 203. The first and second flanges 204 and 205 may be substantially parallel to each other. Also, the first flange 204 has a first slot 206 that is formed substantially symmetrical to a second slot 207 formed in the second flange 205. The first and second slots 206 and 207 may be straight slots that extend at an angle with respect to the base, and may guide a pivot bolt 210 in a particular direction, as will be described later in detail.

The base 203 may further include holes 201a, 201b, 201c, and 201d which may be used to fix the base portion 202 onto the vehicle body 102. For example, bolts or other fasteners may be inserted in the holes 201a, 201b, 201c, and 201d to fix the base portion 202 to the vehicle body 102. Also, the base portion 202 may be fixed onto the lower surface 106 of the slide-out 104 such that the support roller 200 is disposed in a upside down manner with respect to the position of the support roller 200 illustrated in FIG. 2. However, the method of fixing the base portion 202 is not limited to above mentioned description and may be fixed in other ways, including by welding.

Still referring to FIG. 3, the support roller 200 may further include the pivot bolt 210 which is slidably inserted in the slots 206 and 207 when the pivot bolt 210 is in a non-fixed state. Each of the first and second slots 206 and 207 may be angled relative to the base 203. For example, the first and second slots 206 and 207 may be angled at about 30 to 60 degrees relative to a longitudinal direction of the base 203 in some embodiments. In other embodiments, the first and second slots 206 and 207 may be angled at about 40 to 50 degrees relative to a longitudinal direction of the base 203. In some embodiments, the first and second slots 206 and 207 may be angled at about 45 degrees relative to the longitudinal direction of the base 203. The first and second slots 206 and 207 are angled such that the pivot bolt 210 changes its position relative to the base 203 vertically and horizontally at the same time. As a result, the vertical distance between the base 203 and the pivot bolt 210 may be adjusted by sliding the pivot bolt 210 along the first and second slots 206 and 207. In some embodiments, the first and the second slots 206 and 207 are straight slots. However, the first and second slots 206 and 207 are not limited to straight slots. For example, the first and second slots 206 and 207 may be shaped to allow the pivot bolt 210 to be moved vertically and horizontally at the same time along the slots 206 and 207.

Further, the pivot bolt 210 may be fixed in a certain position when the pivot bolt 210 is in a fixed state. The pivot bolt 210 may be fixed by fastening a pivot bolt fastener 212. The pivot bolt fastener 212 may be any type of fastener that allows adjustment of relative position and angle of the pivot bolt 210 and retains the position. For example, the pivot bolt fastener 212 is not limited to a nut or a lock nut and may be any structure that keeps the pivot bolt 210 from sliding such that the pivot bolt 210 stays in a certain position on the first and second flanges 204 and 205. When the pivot bolt 210 is in the fixed state, the pivot bolt 210 may maintain a certain position relative to the first and second slots 206 and 207. Additionally, a washer 217 maybe disposed between the pivot bolt fastener 212 and the first flange 204. Similarly, a washer 218 maybe disposed between the head of the pivot bolt 212 and the second flange 205. In some embodiments, the washers 217 and 218 may be friction washers that may help hold the position of the pivot bolt 210 in the slots 206 and 207.

Figure 4:
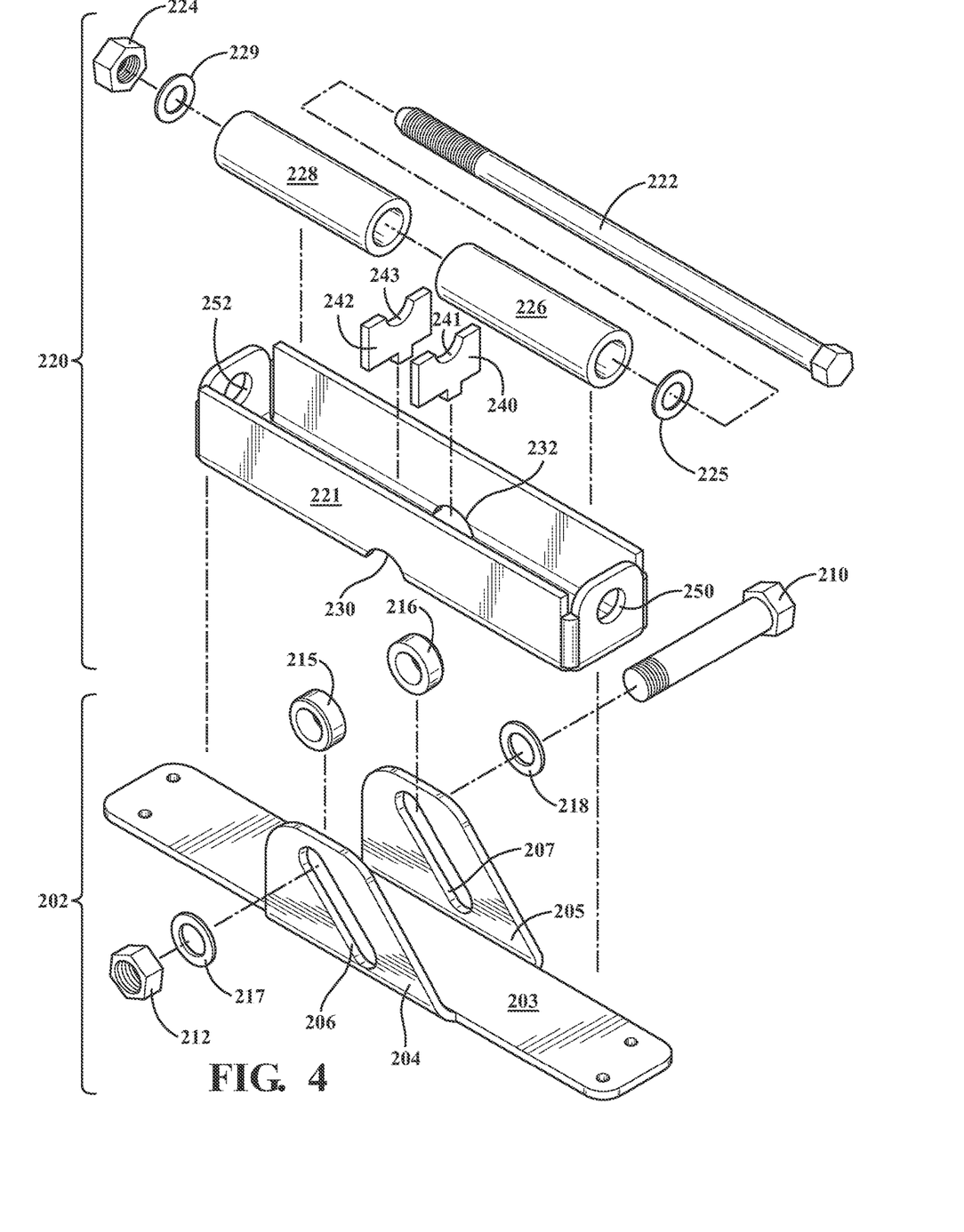
FIG. 4 is an exploded perspective view of the support roller according to an embodiment of the present disclosure.

FIG. 4 is an exploded view of the support roller. Referring to FIG. 4, a roller portion 220 may include a roller housing 221. The top portion of the roller housing 221 may have an opening to receive a first roller 226 and a second roller 228 as well as supporting structures of the first and second rollers 226 and 228, which will be described in more detail later. The roller housing 221 may include spacers 215 and 216 that are disposed at the bottom portion of the roller housing 221. The spacers 215 and 216 may be fixed onto the roller housing 221. For example, the spacers 215 and 216 may be welded onto the roller housing 221. The roller housing 221 may include cut outs 230 and 232, and the spacers 215 and 216 may fit onto the cut outs 230 and 232, respectively.

The roller housing 221 may be rotatably supported by the pivot bolt 210 through the spacers 215 and 216. The pivot bolt 210 may rotatably support spacers 215 and 216 located between the first and second flanges 204 and 205. The spacers 215 and 216 may be bearings or bushings that allow rotation around the pivot bolt 210.

The roller portion 220 may further include the first roller 226 and the second roller 228 that are rotatably supported by a roller shaft 222. The roller shaft 222 may be inserted into openings 250 and 252 in ends of the roller housing 221 such that the roller shaft 222 is supported by the roller housing 221. The roller shaft 222 may be fastened by a roller shaft fastener 224 onto the roller housing 221. Further, a washer 225 may be disposed between the opening 250 and the head of the roller shaft 222. Similarly, a washer 229 may be disposed between the opening 252 and the roller shaft fastener 224. In some embodiments, the washer 225 and 229 may be friction washers that may help fastening the roller shaft 222 onto the roller housing 221.

The roller shaft 222 may be further supported by first and second shaft supports 240 and 242. For example, the first and second shaft supports 240 and 242 may be bolt braces. The first and second shaft supports 240 and 242 may have first and second grooves 241 and 243, respectively, such that the roller shaft 222 may fit into the first and second grooves 241 and 243. The shaft supports 240 and 242 may provide support in the middle portion of the roller shaft 222. For example, the shaft supports 240 and 242 may be disposed between the first roller 226 and the second roller 228. The shaft supports 240 and 242 may further have tongues that fit into cut outs 234 and 236 of the roller housing 221 as shown in FIG. 5.

Figure 5:
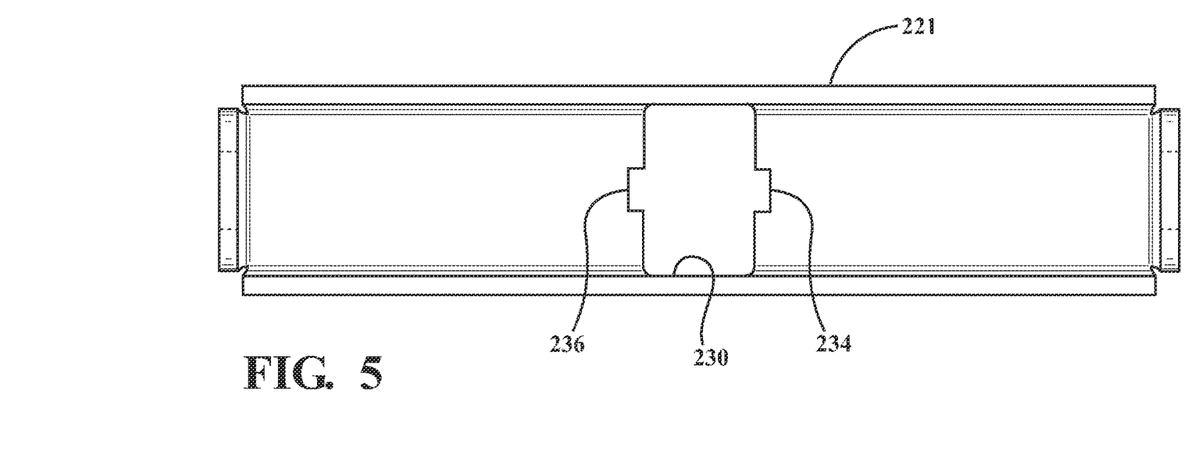
FIG. 5 is a schematic illustration of a top view of a roller housing according to an embodiment of the present disclosure.

FIG. 5 illustrates a top view of the roller housing 221. The roller housing 221 may include the cut outs 234 and 236. The cut outs 234 and 236 may have shapes that accommodate the tongues of the shaft supports 240 and 242.

Figure 6:
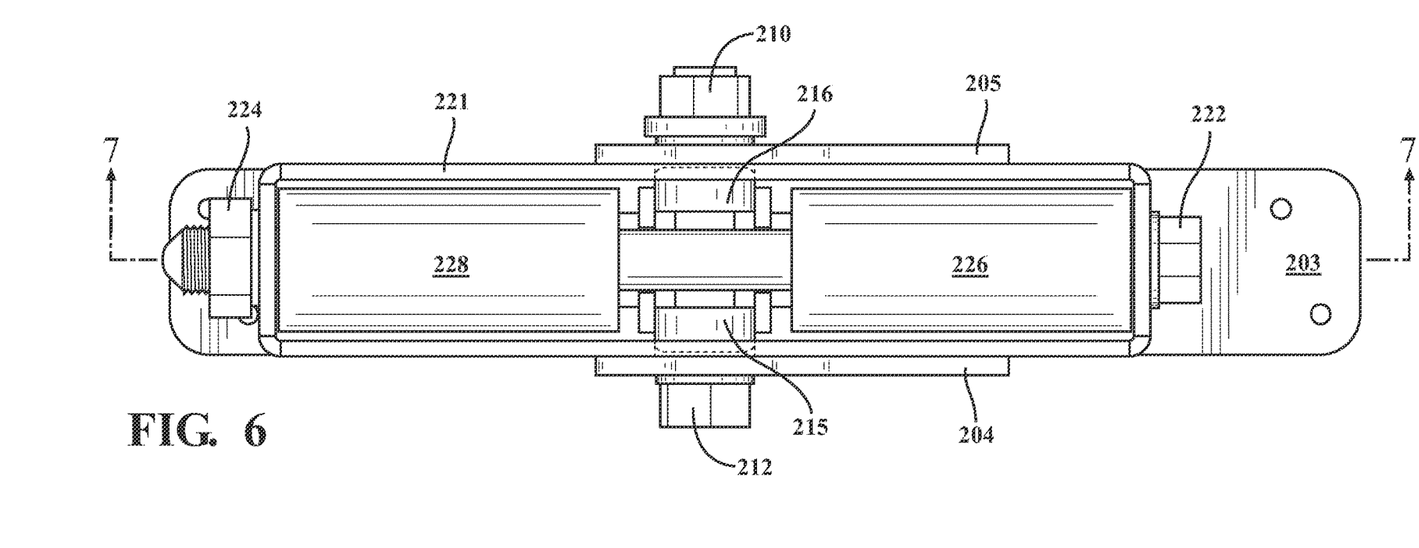
FIG. 6 is a schematic illustration of a top view of the support roller according to an embodiment of the present disclosure.

Referring to FIG. 6, a rotating axis of the roller shaft 222 and a rotating axis of the pivot bolt 210 are substantially perpendicular to each other. The roller shaft 222 is separate from the pivot shaft 210 and may be rotated independently from the pivot bolt 210.

Figure 7:
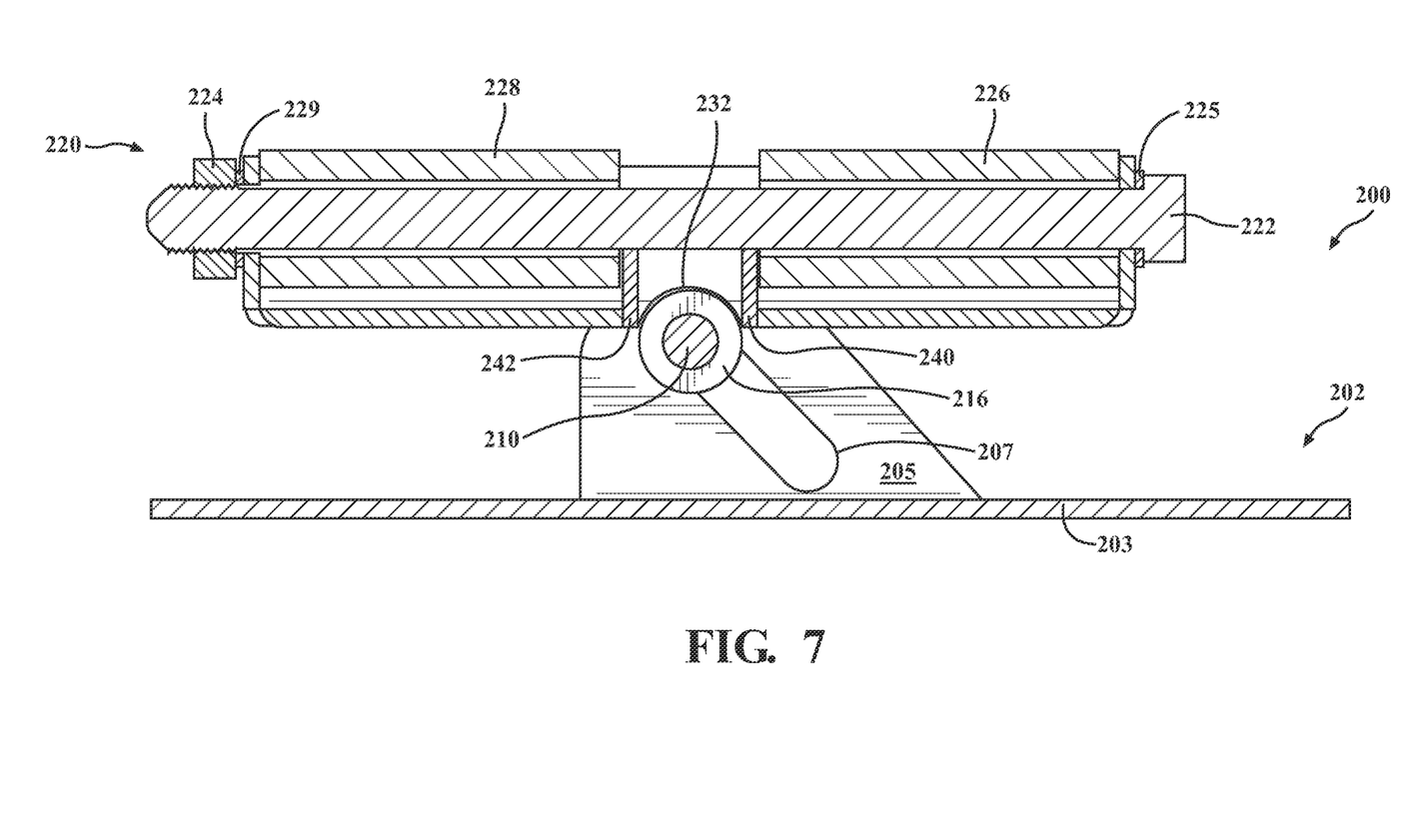
FIG. 7 is a schematic illustration of a cross-sectional view of the support roller taken along line 7-7 of FIG. 6 according to an embodiment of the present disclosure.

FIG. 7 is a schematic illustration of a cross-sectional view of the support roller 200 taken along lines 7-7 of FIG. 6. The roller portion 220 is interconnected with the base portion 202 only by the pivot bolt 210. For example, the roller portion 220 is interconnected with the base portion 202 mono-axially by the pivot bolt 210. In other words, the roller portion 220 is rotatably supported by the pivot bolt 210 as a single axis.

Figure 8:
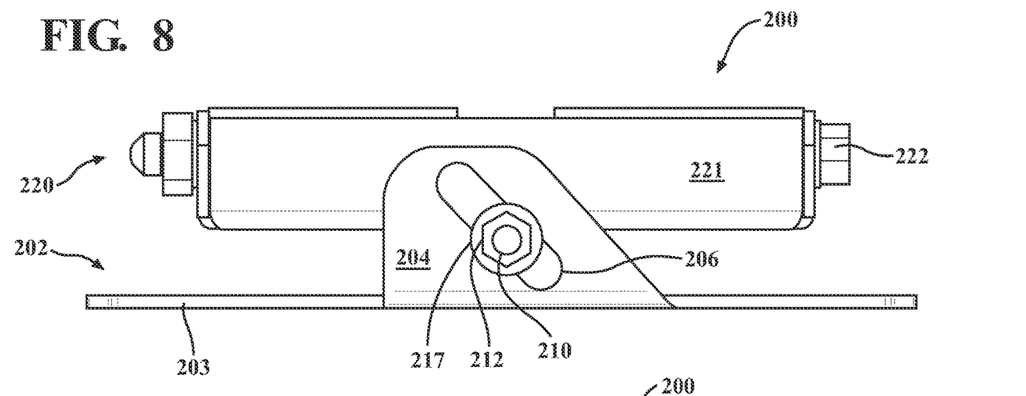
FIG. 8 is a schematic illustration of a side view of the support roller in a position adjusted according to an embodiment of the present disclosure.
Figure 9:
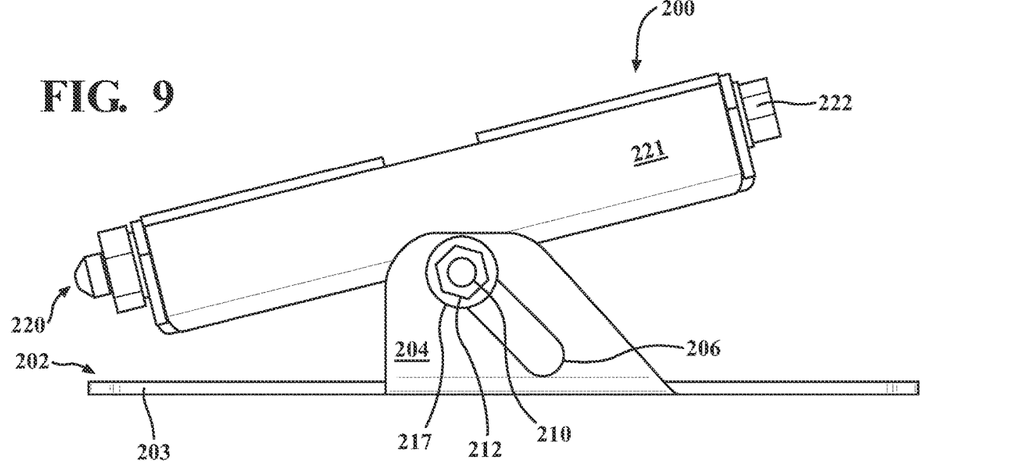
FIG. 9 is a schematic illustration of a side view of the support roller being pivoted according to an embodiment of the present disclosure.
Figure 10:
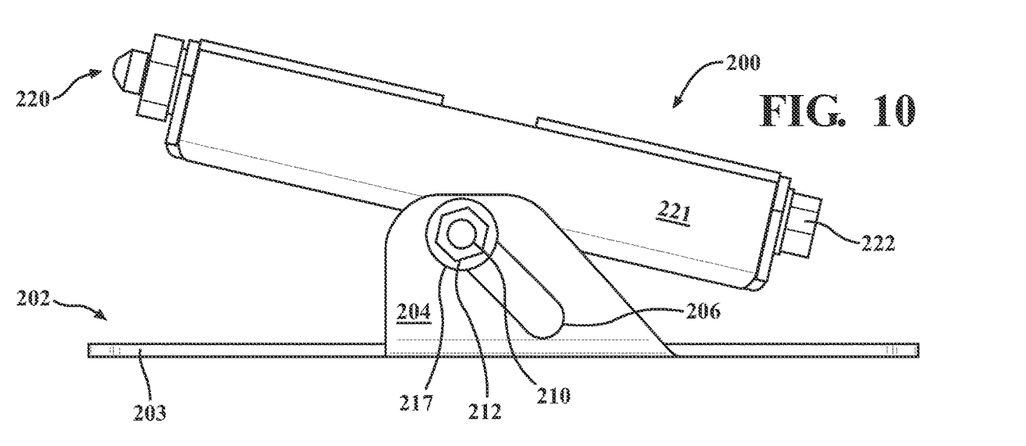
FIG. 10 is a schematic illustration of a side view of the support roller being pivoted according to an embodiment of the present disclosure.

FIGS. 8-10 illustrates adjustment of the support roller 200 which may be moved along the first and second slots 206 and 207 and pivoted about the pivot bolt 210. Referring to FIG. 8, the distance of the roller portion 200 relative to the base 203 may be adjusted by sliding the pivot bolt 210 along the first and second slots 206 and 207. The pivot bolt fastener 212 may be engaged with the pivot bolt 210 to be tightened to fix the position of the roller portion 220.

FIG. 9 illustrates the distance of the roller portion 220 relative to the base 203 adjusted to be greatest. The pivot bolt 210 may be moved to the far end of the first and second slots 206 and 207 relative to the base 203. The roller portion 220, more specifically the roller housing 221, may be pivotable around the pivot bolt 210 as an axis even when the pivot bolt 210 is fixed relative to the first and second slots 206 and 207. In other words, tightening the pivot bolt 210 does not prevent the roller housing 221 from pivoting around the pivot bolt 210. The roller housing 221 may be pivotable both clockwise as illustrated in FIG. 9 and counter clockwise as illustrated in FIG. 10. In other words, the roller housing 221 may be pivotable end-to-end.

One or more aspects of the present disclosure are described here. A first aspect of the present disclosure may include a recreational vehicle having a living space defined therein. The recreational vehicle may comprise a vehicle body enclosing the living space, the vehicle body having a slide-out receiving opening, a slide-out disposed at least partially in the slide-out receiving opening, the slide-out being movable between a retracted position and an extended position, and a support roller disposed between the vehicle body and the slide-out. The support roller may movably supports the slide-out, the support roller having a base portion and a roller portion. The base portion of the support roller may have a base, first and second flanges extending from the base, a slot being defined in each of the first and second flanges, and a pivot bolt supported by the slot. The roller portion may include a roller housing, a roller shaft supported in the roller portion, and a roller rotatably supported on the roller shaft. The pivot bolt may interconnect the roller housing with the slots in the first and second flanges. The pivot bolt in a non-fixed state may be slidable along the slots such that a distance between the base and the roller housing is adjusted by adjusting the pivot bolt in the slots. The pivot bolt in a fixed state may be fixed relative to the slots, and the roller housing may be pivotable around the pivot bolt as an axis.

A second aspect of the present disclosure may include the first aspect, wherein the roller shaft is supported in the roller portion by a shaft support.

A third aspect of the present disclosure may include the first or second aspect, wherein the roller comprises a first roller and a second roller, and the shaft support is disposed between the first and the second rollers.

A fourth aspect of the present disclosure may include any one of the first through third aspects, wherein the shaft support comprises first and second shaft supports, the pivot bolt being disposed between the first and the second shaft supports.

A fifth aspect of the present disclosure may include any one of the first through fourth aspects, wherein the roller comprises a first roller and a second roller, the first shaft support is disposed between the first roller and the pivot bolt, and the second shaft support is disposed between the second roller and the pivot bolt.

A sixth aspect of the present disclosure may include any one of the first through fifth aspects, wherein the pivot bolt and the shaft support are spaced from each other by a spacer.

A seventh aspect of the present disclosure may include any one of the first through sixth aspects, wherein the axis of the pivot bolt and an axis of the roller shaft are substantially perpendicular to each other.

An eighth aspect of the present disclosure may include any one of the first through seventh aspects, wherein the pivot bolt is disposed between the roller shaft and the base.

A ninth aspect of the present disclosure may include the eighth aspect, wherein the roller portion is interconnected with the base portion mono-axially by the pivot bolt.

A tenth aspect of the present disclosure may include any one of the first through ninth aspects, wherein the roller portion is interconnected with the base portion only by the pivot bolt.

An eleventh aspect of the present disclosure may include any one of the first through tenth aspects, wherein the pivot bolt is fixed by tightening a fastener.

A twelfth aspect of the present disclosure may include the eleventh aspect, wherein the slots are angled such that the pivot bolt is movable along the slots vertically and horizontally relative to the base at the same time.

A thirteenth aspect of the present disclosure may include the twelfth aspect, wherein the slots are angled at about 30 to 60 degrees relative to the longitudinal direction of the base.

A fourteenth aspect of the present disclosure may include any one of the first through thirteenth aspects, wherein the first and second flanges each extend from the base substantially perpendicular to the base.

A fifteenth aspect may of the present disclosure may include any one of the first through fourteenth aspects, wherein the first and second flanges are substantially parallel to each other.

A sixteenth aspect of the present disclosure may include any one of the first through fifteenth aspects, wherein the base portion is fixed to the vehicle body or the slide-out, and the roller portion is engaged with the other of the vehicle body or the slide-out.

A seventeenth aspect of the present disclosure may include any one of the first through sixteenth aspects, wherein the base portion is fixed to the vehicle body or the slide-out, and the support roller supports the other of the vehicle body or the slide-out.

An eighteenth aspect of the present disclosure may include any one of the first through seventeenth aspects, wherein the roller housing is pivotable around the axis of the pivot bolt when the pivot bolt is in the fixed state.

A nineteenth aspect of the present disclosure may include a recreational vehicle. The recreational vehicle may comprise a vehicle body generally enclosing a living space, the vehicle body having an exterior body surface and a slide-out receiving opening defined in the exterior body surface. A slide-out may be disposed at least partially in the slide-out receiving opening, the slide-out having an exterior slide-out surface and a lower surface. The slide-out may be movable between a retracted position wherein the exterior slide-out surface is generally flush with the exterior body surface and an extended position wherein the exterior slide-out surface is spaced outwardly from the exterior body surface. At least one support roller may be disposed between the vehicle body and the slide-out, the support roller having a base portion fixed to the vehicle body or the slide-out and a roller portion engaging the other of the vehicle body or the slide-out. The base portion of the at least one support roller may have a base and first and second flanges extending upwardly from the base, a slot being defined in each of the first and second flanges. The roller portion may include a roller housing, a roller shaft supported in the roller portion, and at least one roller rotatably supported on the roller shaft. A pivot bolt may interconnect the roller housing with the slots in the first and second flanges such that a distance between the base and the roller housing is adjusted by adjusting the pivot bolt in the slots, and the roller housing may be pivotable end-to-end when the pivot bolt is fixed.

It is also noted that recitations herein of "at least one" component, element, etc., should not be used to create an inference that the alternative use of the articles "a" or "an" should be limited to a single component, element, etc. For example, the use of "at least one fluid storage vessel" should not be interpreted to mean that the recreational vehicle can only include one fluid storage vessel.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially," "about," and "approximately," unless otherwise defined, are utilized herein to represent the inherent degree of uncertainty that may be attributed to any quantitative comparison, value, measurement, or other representation. The terms "substantially," "about," and "approximately," unless otherwise defined, are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A recreational vehicle having a living space defined therein, the recreational vehicle comprising:
    a vehicle body enclosing the living space, the vehicle body having a slide-out receiving opening;
    a slide-out disposed at least partially in the slide-out receiving opening, the slide-out being movable between a retracted position and an extended position;
    a support roller disposed between the vehicle body and the slide-out and movably supporting the slide-out, the support roller having a base portion and a roller portion;
    wherein;
        the base portion of the support roller has a base, first and second flanges extending from the base, a slot being defined in each of the first and second flanges, and a pivot bolt supported by the slot;
        the roller portion includes a roller housing, a roller shaft supported in the roller portion, and a roller rotatably supported on the roller shaft;
        the pivot bolt interconnects the roller housing with the slots in the first and second flanges, the pivot bolt in a non-fixed state being slidable along the slots such that a distance between the base and the roller housing is adjusted by adjusting the pivot bolt in the slots, the pivot bolt in a fixed state being fixed relative to the slots; and
        the roller housing being pivotable around the pivot bolt as an axis.

2. The recreational vehicle according to claim 1, wherein the roller shaft is supported in the roller portion by a shaft support.

3. The recreational vehicle according to claim 2, wherein the roller comprises a first roller and a second roller, and the shaft support is disposed between the first and the second rollers.

4. The recreational vehicle according to claim 2, wherein the shaft support comprises at first and second shaft supports, the pivot bolt being disposed between the first and the second shaft supports.

5. The recreational vehicle according to claim 4, wherein the roller comprises a first roller and a second roller, the first shaft support is disposed between the first roller and the pivot bolt, and the second shaft support is disposed between the second roller and the pivot bolt.

6. The recreational vehicle according to claim 2, wherein the pivot bolt and the shaft support are spaced from each other by a spacer.

7. The recreational vehicle according to claim 1, wherein the axis of the pivot bolt and an axis of the roller shaft are substantially perpendicular to each other.

8. The recreational vehicle according to claim 1, wherein the pivot bolt is disposed between the roller shaft and the base.

9. The recreational vehicle according to claim 1, wherein the roller portion is interconnected with the base portion mono-axially by the pivot bolt.

10. The recreational vehicle according to claim 1, wherein the roller portion is interconnected with the base portion only by the pivot bolt.

11. The recreational vehicle according to claim 1, wherein the pivot bolt is fixed by tightening a fastener.

12. The recreational vehicle according to claim 1, wherein the slots are angled such that the pivot bolt is movable along the slots vertically and horizontally relative to the base at the same time.

13. The recreational vehicle according to claim 1, wherein the slots are angled at about 30 to 60 degrees relative to the longitudinal direction of the base.

14. The recreational vehicle according to claim 1, wherein the first and second flanges each extend from the base substantially perpendicular to the base.

15. The recreational vehicle according to claim 1, wherein the first and second flanges are substantially parallel to each other.

16. The recreational vehicle according to claim 1, wherein the base portion is fixed to the vehicle body or the slide-out, and the roller portion is engaged with the other of the vehicle body or the slide-out.

17. The recreational vehicle according to claim 1, wherein the base portion is fixed to the vehicle body or the slide-out, and the support roller supports the other of the vehicle body or the slide-out.

18. The recreational vehicle according to claim 1, wherein the roller housing is pivotable around the axis of the pivot bolt when the pivot bolt is in the fixed state.

19. A recreational vehicle comprising:
a vehicle body generally enclosing a living space, the vehicle body having an exterior body surface and a slide-out receiving opening defined in the exterior body surface;
a slide-out disposed at least partially in the slide-out receiving opening, the slide-out having an exterior slide-out surface and a lower surface, the slide-out being movable between a retracted position wherein the exterior slide-out surface is generally flush with the exterior body surface and an extended position wherein the exterior slide-out surface is spaced outwardly from the exterior body surface;
at least one support roller disposed between the vehicle body and the slide-out, the support roller having a base portion fixed to the vehicle body or the slide-out and a roller portion engaging the other of the vehicle body or the slide-out;
wherein;
the base portion of the at least one support roller has a base and first and second flanges extending upwardly from the base, a slot being defined in each of the first and second flanges;
the roller portion includes a roller housing, a roller shaft supported in the roller portion, and at least one roller rotatably supported on the roller shaft; and
a pivot bolt interconnects the roller housing with the slots in the first and second flanges such that a distance between the base and the roller housing is adjusted by adjusting the pivot bolt in the slots, the roller housing being pivotable end-to-end when the pivot bolt is fixed.

* * * * *